US010066733B2

(12) United States Patent
Anglin

(10) Patent No.: US 10,066,733 B2
(45) Date of Patent: Sep. 4, 2018

(54) OIL DIRECTION CONTROL BAFFLE

(71) Applicant: United Technologies Corporation, Farmington, CT (US)

(72) Inventor: Christopher Anglin, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 13 days.

(21) Appl. No.: 15/214,262

(22) Filed: Jul. 19, 2016

(65) Prior Publication Data
US 2018/0023684 A1 Jan. 25, 2018

(51) Int. Cl.
F16H 57/04 (2010.01)
F02C 7/32 (2006.01)

(52) U.S. Cl.
CPC ......... F16H 57/0427 (2013.01); F02C 7/32 (2013.01); F16H 57/042 (2013.01); F16H 57/0409 (2013.01); F16H 57/0421 (2013.01); F16H 57/0493 (2013.01); F16H 57/0495 (2013.01); F05D 2260/4031 (2013.01); F05D 2260/98 (2013.01)

(58) Field of Classification Search
CPC .............. F16H 57/042; F16H 57/0421; F16H 57/0427; F16H 57/0495; F16H 1/14; F16H 57/0409; F16H 57/0423; F05D 2260/4031; F05D 2260/98
USPC .................................. 74/423, 467; 184/6.12
See application file for complete search history.

(56) References Cited

U.S. PATENT DOCUMENTS

| 9,068,515 | B2 | 6/2015 | Duong | |
| 2003/0124013 | A1* | 7/2003 | Szczepanski | F04C 2/082 418/201.1 |
| 2010/0319486 | A1* | 12/2010 | Kawamoto | F16H 57/0423 74/665 L |
| 2011/0192245 | A1* | 8/2011 | Shioiri | F16H 57/0423 74/467 |
| 2013/0233107 | A1* | 9/2013 | Von Wilmowsky | F16H 57/0423 74/421 R |

(Continued)

FOREIGN PATENT DOCUMENTS

| CN | 204985666 | 1/2016 |
| EP | 3199837 | 8/2017 |

OTHER PUBLICATIONS

U.S. Appl. No. 14/949,120, filed Nov. 23, 2015 entitled "Gear Baffle Configured With Lubricant Outlet Passage."

(Continued)

Primary Examiner — William C Joyce
Assistant Examiner — Joseph Brown
(74) Attorney, Agent, or Firm — Snell & Wilmer L.L.P.

(57) ABSTRACT

A baffle for a gear may comprise a baffle wall and a baffle outlet, the baffle wall having a peripheral portion at least partially defining a channel, the channel extending circumferentially around an axial centerline, the channel configured to receive lubricant through a slot, the slot extending circumferentially around the axial centerline. The baffle wall may be configured to prevent a subset of gear teeth from receiving lubricant. A width of the slot may vary along a circumferential direction. A cross-section area of the channel may vary along the circumferential direction. The cross-section area of the channel may increase along a direction of rotation of the subset of gear teeth.

20 Claims, 7 Drawing Sheets

(56) References Cited

U.S. PATENT DOCUMENTS

| | | | |
|---|---|---|---|
| 2014/0054114 A1* | 2/2014 | Isomura | F16H 57/0423 184/6.12 |
| 2015/0097073 A1* | 4/2015 | McPeak | F16H 57/0423 244/17.11 |
| 2017/0030457 A1 | 2/2017 | Hotait | |
| 2017/0146112 A1* | 5/2017 | Anglin | F16H 57/0421 |
| 2017/0284534 A1* | 10/2017 | Anglin | F16H 57/0423 |

OTHER PUBLICATIONS

U.S. Appl. No. 15/091,149, filed Apr. 5, 2016 entitled "Slotted Oil Baffle for Gears."
EP Search report dated Dec. 8, 2017 ion EP Application No. 17182002.0.

\* cited by examiner

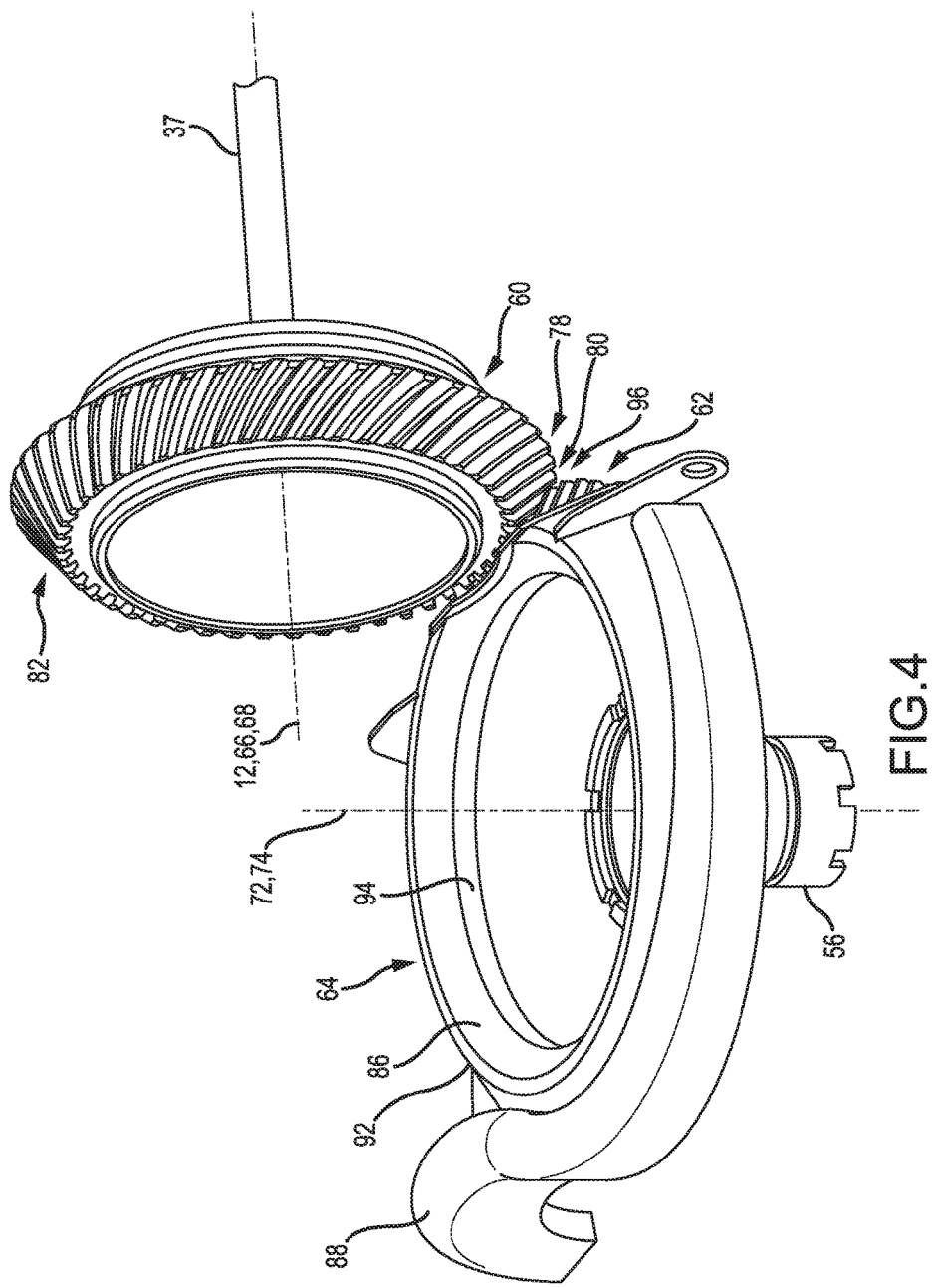

OIL DIRECTION CONTROL BAFFLE

FIELD

This disclosure relates generally to transmission systems, and, more particularly, to a baffle for a set of meshing gears such as, for example, meshing bevel gears in a turbine engine.

BACKGROUND

A turbine engine may include a transmission system for coupling one of its spools to an accessory gearbox. This transmission system may include a bull gear mounted to a shaft of the spool. The transmission system may also include a tower shaft and an associated bevel gear mounted to a first end of the tower shaft, where a second end of the tower shaft is coupled to the accessory gearbox. The transmission system may also include a baffle configured to cover at least a portion of the bevel gear (or the bull gear).

SUMMARY

A baffle for a gear may comprise a baffle wall and a baffle outlet, the baffle wall having a peripheral portion at least partially defining a channel, the channel extending circumferentially around an axial centerline, the channel configured to receive a lubricant through a slot, the slot extending circumferentially around the axial centerline.

In various embodiments, the baffle wall may be configured to prevent a subset of gear teeth from receiving the lubricant. The channel may extend between 1.5 radians and 4.8 radians circumferentially around the axial centerline. The slot may be disposed in an inner wall at least partially defining the channel. The baffle may further comprise a window, a portion of the gear extending radially through the window. The slot may extend between 1.5 radians and 4.8 radians circumferentially around the axial centerline. The channel may be configured to direct the lubricant in a direction of rotation of the subset of gear teeth towards the baffle outlet. The baffle outlet may comprise a duct configured to direct the lubricant away from the subset of gear teeth. A width of the slot may vary along a circumferential direction. A cross-section area of the channel may vary along a circumferential direction. The cross-section area of the channel may increase along a direction of rotation of the subset of gear teeth.

A transmission system may comprise a first bevel gear, a second bevel gear meshed with the first bevel gear, and including a plurality of gear teeth arranged in a circumferential array, and a baffle including a baffle wall and a baffle outlet, the baffle wall arranged next to and covering a subset of the gear teeth, the baffle wall having a peripheral portion defining a channel, the channel extending circumferentially around a rotational axis, the channel configured to receive a lubricant through a slot disposed in the peripheral portion, the slot extending circumferentially around the rotational axis.

In various embodiments, the subset of the gear teeth may be disengaged from the first bevel gear, and another subset of the gear teeth are meshed with the first bevel gear. The baffle wall may be configured to substantially prevent the subset of the gear teeth from receiving lubricant. The slot may be disposed in an inner wall defining the channel. The baffle may further comprise a window, a portion of the second bevel gear extending radially out through the window, and the portion of the second bevel gear meshes with the first bevel gear. The baffle outlet may comprise a duct configured to direct the lubricant away from the subset of gear teeth. The channel may extend between 1.5 radians and 4.8 radians circumferentially around the rotational axis. The slot may extend between 1.5 radians and 4.8 radians circumferentially around the rotational axis.

A turbine engine may comprise a turbine engine spool, a tower shaft, a bearing compartment, and a transmission system located within the bearing compartment, the transmission system comprising a first bevel gear, a second bevel gear, and a baffle, the first bevel gear connected to the turbine engine spool, the second bevel gear connected to the tower shaft and configured to rotate about a rotational axis, wherein the second bevel gear includes a plurality of gear teeth arranged in a circumferential array, wherein a first subset of the gear teeth within a first region are meshed with the first bevel gear, and a second subset of the gear teeth within a second region are disengaged from the first bevel gear; and the baffle including a baffle wall and a baffle outlet, the baffle wall covering the second subset of the gear teeth, the baffle wall having a peripheral portion defining a channel, the channel extending circumferentially around the rotational axis, the channel configured to receive lubricant through a slot disposed in a radially inward wall at least partially defining the channel, the slot extending circumferentially around the rotational axis.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

FIG. 4 illustrates a perspective view of the transmission system, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

A turbine engine may include a transmission system for coupling one of its spools to an accessory gearbox. This transmission system may include a bull gear mounted to a shaft of the spool. The transmission system may also include a tower shaft and an associated bevel gear mounted to a first end of the tower shaft, where a second end of the tower shaft is coupled to the accessory gearbox. The transmission system may also include a baffle configured to cover at least a portion of the bevel gear (or the bull gear). Such a baffle may be provided so as to prevent surplus lubricant, churning within a compartment in which the transmission system is located, from impinging on that portion of the bevel gear (or the bull gear) since such surplus lubricant impingement may increase windage (e.g., fluid drag) on the bevel gear (or the bull gear). However, such a baffle may also capture lubricant which is propelled off the bevel gear. This captured lubricant may churn within the space between the bevel gear and the baffle and thereby cause windage on the bevel gear.

Figure 1:
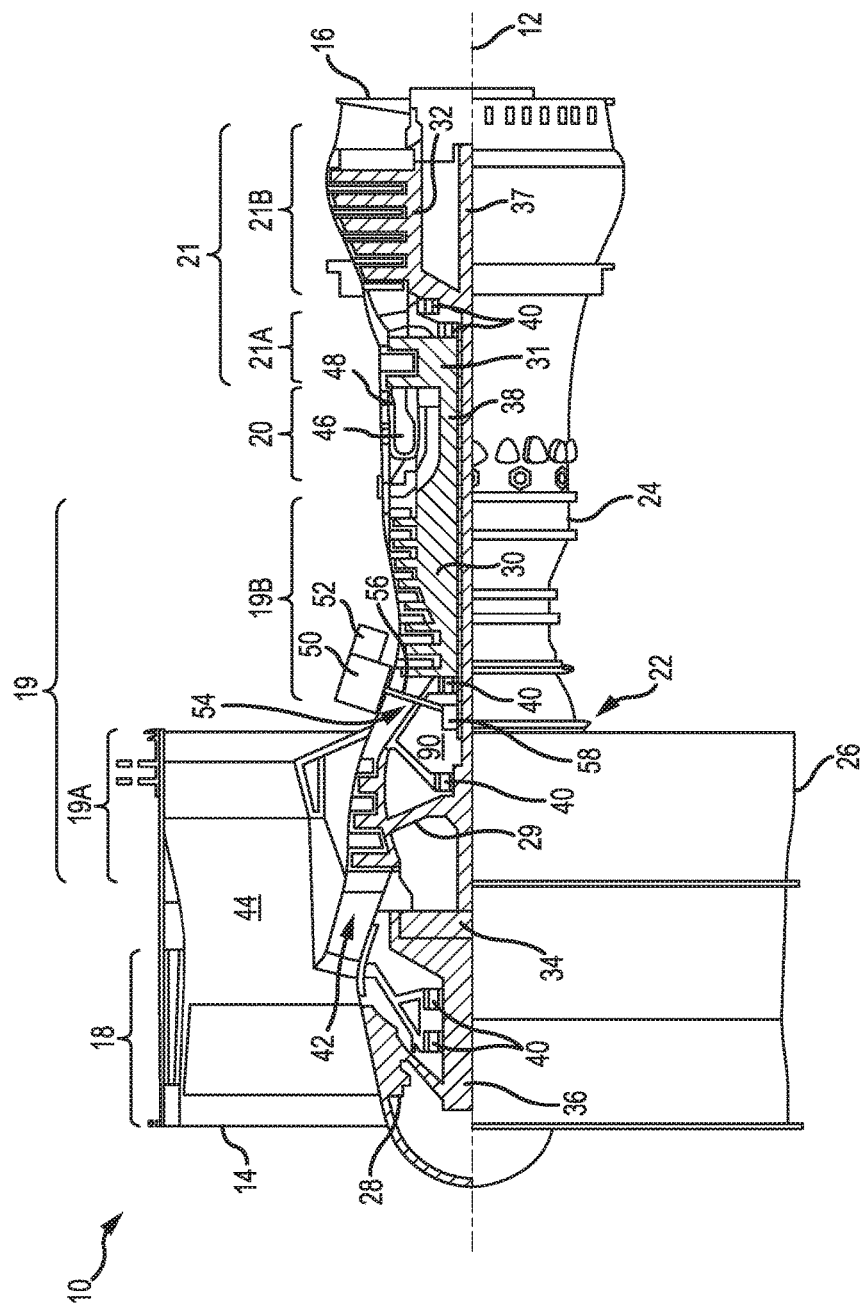
FIG. 1 illustrates a side cutaway view of a geared turbine engine, in accordance with various embodiments.

With reference to FIG. 1, a side cutaway illustration of a geared turbine engine 10, which is configured as a turbofan engine for an aircraft propulsion system, is illustrated, in accordance with various embodiments. Turbine engine 10 extends along an axial centerline 12 between an upstream airflow inlet 14 and a downstream airflow exhaust 16.

The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. This housing 22 includes an inner case 24 (e.g., a core case) and an outer case 26 (e.g., a fan case). The inner case 24 may house one or more of the engine sections 19-21; e.g., an engine core. The outer case 26 may house at least the fan section 18.

Each of the engine sections 18, 19A, 19B, 21A and 21B includes a respective rotor 28-32. Each of these rotors 28-32 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 28 is connected to a gear train 34, for example, through a fan shaft 36. The gear train 34 and the LPC rotor 29 are connected to and driven by the LPT rotor 32 through a low speed shaft 37. The combination of at least the LPC rotor 29, the LPT rotor 32 and low speed shaft 37 may be referred to as "a low speed spool". The HPC rotor 30 is connected to and driven by the HPT rotor 31 through a high speed shaft 38. The combination of at least the HPC rotor 30, the HPT rotor 31 and high speed shaft 38 may be referred to as "a high speed spool". The shafts 36-38 are rotatably supported by a plurality of bearings 40; e.g., rolling element and/or thrust bearings. Each of these bearings 40 is connected to the engine housing 22 by at least one stationary structure such as, for example, an annular support strut.

During operation, air enters the turbine engine 10 through the airflow inlet 14. This air is directed through the fan section 18 and into a core gas path 42 and a bypass gas path 44. The core gas path 42 flows sequentially through the engine sections 19-21. The air within the core gas path 42 may be referred to as "core air". The bypass gas path 44 flows through a duct between the inner case 24 and the outer case 26. The air within the bypass gas path 44 may be referred to as "bypass air".

The core air is compressed by the compressor rotors 29 and 30 and directed into a combustion chamber 46 of a combustor 48 in the combustor section 20. Fuel is injected into the combustion chamber 46 and mixed with the compressed core air to provide a fuel-air mixture. This fuel air mixture is ignited and combustion products thereof expand and flow through and sequentially cause the turbine rotors 31 and 32 to rotate. The rotation of the turbine rotors 31 and 32 respectively drive rotation of the compressor rotors 30 and 29 and, thus, compression of the air received from the core airflow inlet 14. The rotation of the turbine rotor 32 also drives rotation of the fan rotor 28, which propels bypass air through and out of the bypass gas path 44. The propulsion of the bypass air may account for a majority of thrust generated by the turbine engine 10, e.g., more than seventy-five percent (75%) of engine thrust. The turbine engine 10 of the present disclosure, however, is not limited to the foregoing exemplary thrust ratio.

The turbine engine 10 of FIG. 1 may include an accessory gearbox 50, one or more gearbox attachments 52, and a transmission system 54. The accessory gearbox 50 may be mounted to the inner case 24. However, in alternative embodiments, the accessory gearbox 50 may be mounted elsewhere with the turbine engine 10; e.g., to the outer case 26. The accessory gearbox 50 may be configured to transfer rotational energy (e.g., torque) between the transmission system 54 and the one or more gearbox attachments 52. An example of an accessory gearbox is disclosed in U.S. Pat. No. 9,068,515 to Duong et al., which is incorporated by reference herein in its entirety. Examples of a gearbox attachment may include an air turbine starter, a deoiler, a hydraulic pump, an oil pump, an integrated drive generator, a permanent magnet alternator and a fuel pump module. Of course, the present disclosure is not limited to including the foregoing exemplary types or configurations of the accessory gearbox 50 or the gearbox attachments 52.

Figure 2:
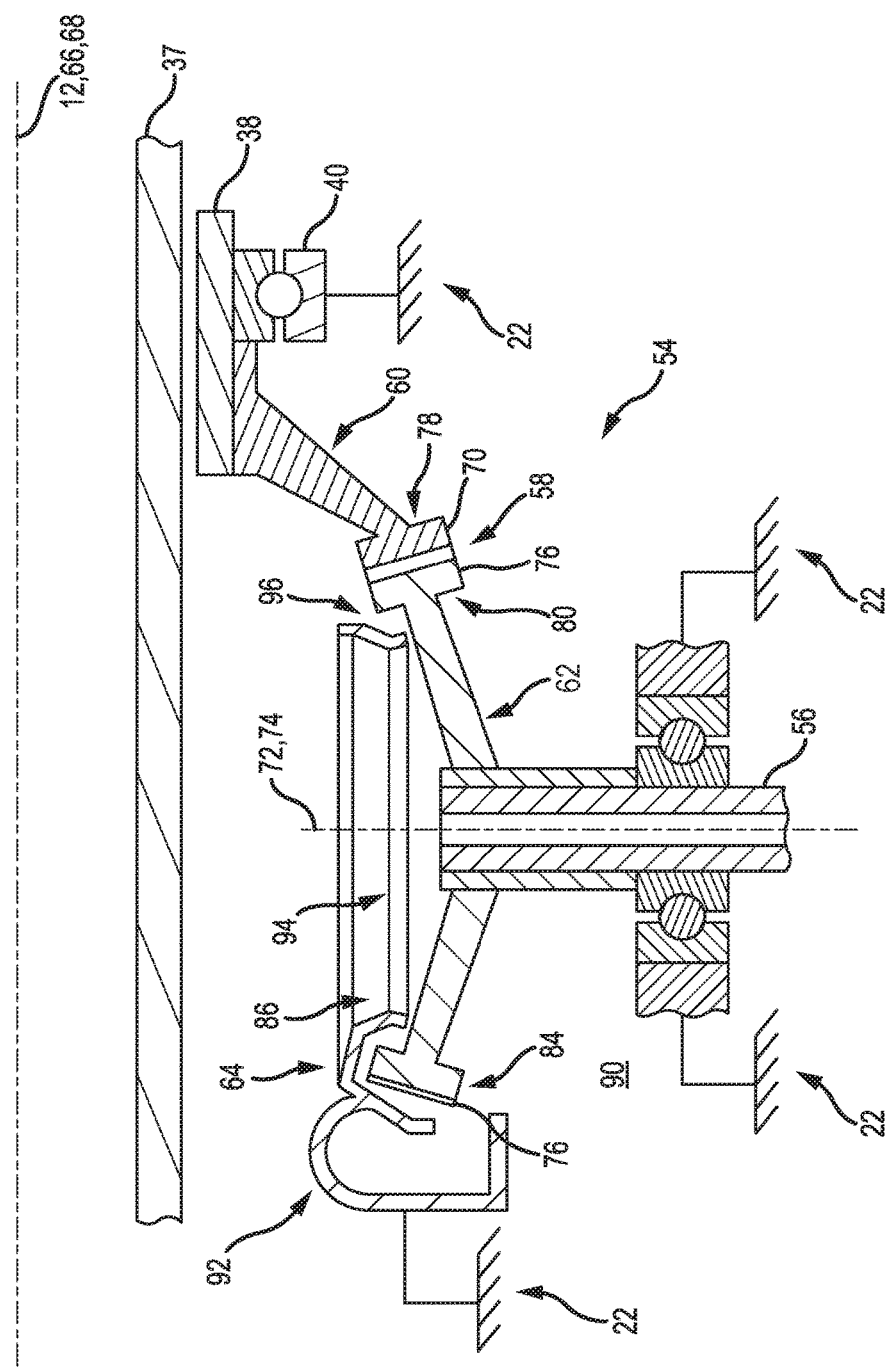
FIG. 2 illustrates a side sectional schematic diagram of a transmission system, in accordance with various embodiments.

The transmission system 54 may be configured to mechanically couple and thereby transfer rotational energy (e.g., torque) between a rotating assembly (or component) of the turbine engine 10 and the accessory gearbox 50. In particular, the transmission system 54 of FIG. 1 mechanically couples one of the spools of the turbine engine 10 (e.g., via the high speed spool) with the accessory gearbox 50. This transmission system 54 includes the high speed shaft 38, a tower shaft 56 and a geared system 58. Referring to FIG. 2, the geared system 58 may include a first gear 60, a second gear 62, and a baffle 64.

The first gear 60 of FIG. 2 is configured as a bevel gear and, in particular, as a bull bevel gear. This first gear 60 may be mounted to the high speed shaft 38, for example, by a splined interface. The first gear 60 may have a first rotational axis 66, which may be coaxial with a rotational axis 68 of the low speed shaft 37 which is also the centerline 12.

Figure 3:
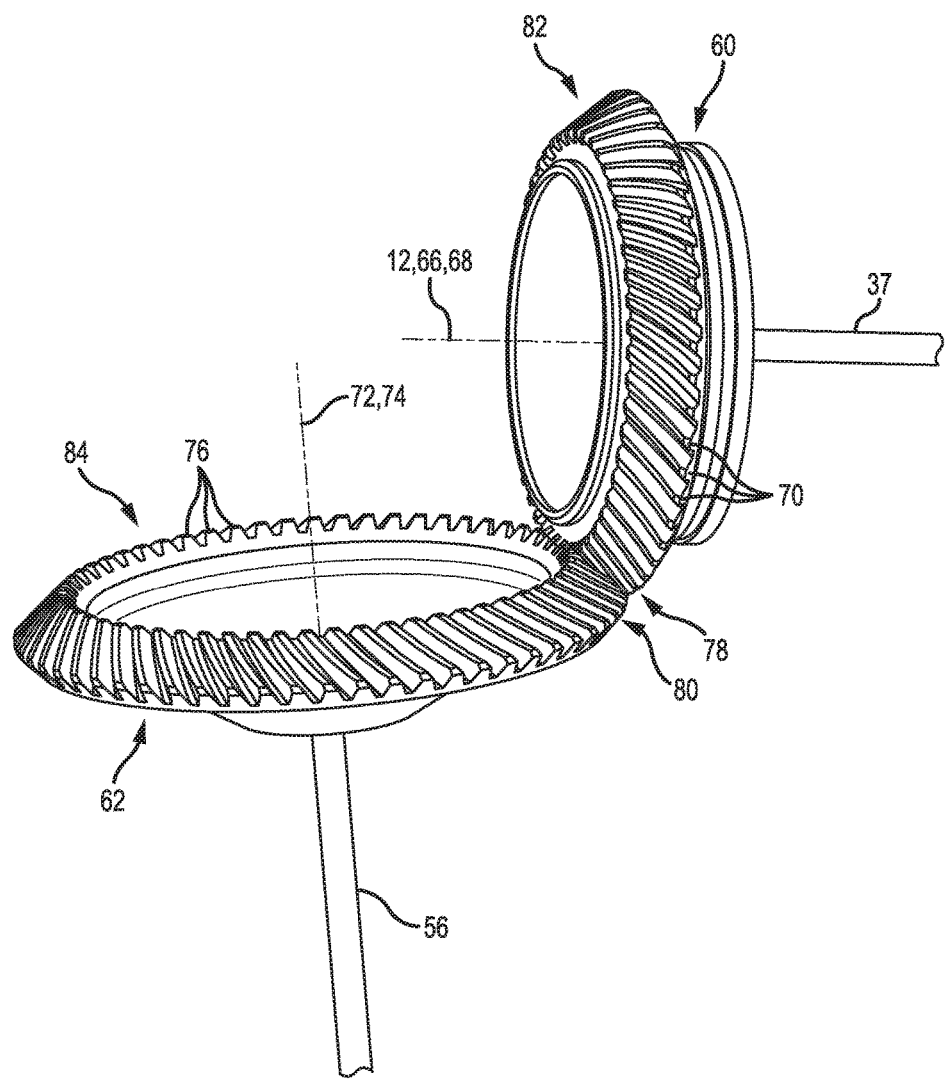
FIG. 3 illustrates a perspective view of meshing gears and associated shafts for the transmission system, in accordance with various embodiments.

With additional reference to FIG. 3, the first gear 60 may include a plurality of first gear teeth 70. These first gear teeth 70 may be arranged in a circumferential array, which extends circumferentially around the first rotational axis 66. The first gear teeth 70 of FIG. 3 are configured to provide the first gear 60 with an annular, conically shaped pitch surface. Herein, the term "pitch surface" may describe an imaginary toothless surface formed by averaging the peaks and valleys of the first gear teeth 70. The first gear teeth 70 of FIG. 3 may be further configured to provide the first gear 60 with a spiral (or helical) bevel gear configuration. However, in various embodiments, the first gear teeth 70 may be configured to provide the first gear 60 with a straight bevel gear configuration, a Zerol bevel gear configuration, a hypoid bevel gear configuration or a double spiral (or helical) bevel gear configuration. The present disclosure, of course, is not limited to the foregoing exemplary first gear types or configurations.

The second gear 62 of FIG. 2 is also configured as a bevel gear. This second gear 62 may be mounted to the tower shaft 56, for example, by a splined interface. The second gear 62 may have a second rotational axis 72, which may be coaxial with a rotational axis 74 of the tower shaft 56. This second rotational axis 72 may be arranged coincident with and at least generally (e.g., within +/- one or two degrees) perpendicular to the first rotational axis 66. However, in various embodiments, the second rotational axis 72 may be arranged coincident with and acutely or obtusely angled to the first rotational axis 66.

With reference to FIG. 3, the second gear 62 may include a plurality of second gear teeth 76. These second gear teeth 76 may be arranged in a circumferential array, which may extend circumferentially around the second rotational axis 72. The second gear teeth 76 of FIG. 3 are configured to provide the second gear 62 with an annular, conically shaped pitch surface. The second gear teeth 76 of FIG. 3 may be further configured to provide the second gear 62 with a spiral (or helical) bevel gear configuration. However, in various embodiments, the second gear teeth 76 may be configured to provide the second gear 62 with a straight bevel gear configuration, a Zerol bevel gear configuration, a hypoid bevel gear configuration or a double spiral (or helical) bevel gear configuration. The present disclosure, of course, is not limited to the foregoing exemplary second gear types or configurations.

The second gear 62 may be meshed (e.g., mated and engaged) with the first gear 60. In particular, a first subset 78 (e.g., meshed subarray) of the first gear teeth 70 may be mesh with a first subset 80 (e.g., meshed subarray) of the second gear teeth 76, where each of these subsets 78, 80 includes one or more of the respective gear teeth 70, 76. With the foregoing meshed configuration, a second subset 82 (e.g., unmeshed subarray) of the first gear teeth 70 (e.g., the remaining first gear teeth) are unmeshed and disengaged from a second subset 84 (e.g., unmeshed subarray) of the second gear teeth 76 (e.g., the remaining second gear teeth), where each of these subsets 82, 84 includes a plurality—e.g., here the majority—of the respective gear teeth 70, 76. It should be noted that the specific gear teeth in each subset will change as the respective gear rotates about its respective rotational axis.

With combined reference to FIG. 2, FIG. 3, and FIG. 4, baffle 64 may be arranged with (e.g., positioned next to and in close proximity with) the second gear 62 so as to cover a region of the second gear 62 as described below in further detail. The baffle 64 may be connected to a stationary structure (see FIG. 2; e.g., generally the housing 22) and thereby may remain stationary as the second gear 62 rotates about its second rotational axis 72. In various embodiments, baffle 64 may comprise a single unitary member. In various embodiments, baffle 64 may be segmented.

In various embodiments, the baffle 64 may include a baffle wall 86. The baffle wall 86 may be configured to cover the second subset 84 of the second gear teeth 76. The baffle wall 86, however, may not cover the first subset 80 of the second gear teeth 76; i.e., leaves the first subset 80 uncovered and exposed. In this manner, the baffle wall 86 may be operable to enable a lubricant system to direct lubricant (e.g., oil) onto the first and/or the second gear teeth 70, 76 just prior to and/or at a region where those gear teeth mesh with one another (see FIG. 3). However, the baffle wall 86 may be operable to substantially prevent the unmeshed/disengaged second gear teeth 76 (e.g., the second subset 84 of the second gear teeth) from being impinged by or otherwise receiving additional lubricant; e.g., lubricant particles churning or otherwise moving around a compartment 90 (e.g., bearing compartment) in which the transmission system 54 is located, with momentary reference to FIG. 2. Such additional lubricant, if allowed to impinge on the unmeshed/disengaged second gear teeth 76, may increase second gear 62 windage and thereby decrease efficiency of the transmission system 54 and, thus, the turbine engine 10.

With reference to FIG. 4, the baffle wall 86 may be configured as a circular body. Baffle wall 86 may include a radial outer peripheral portion 92 and a radial interior portion 94. The peripheral portion 92 may be located radially outward from the radial interior portion 94. The peripheral portion 92 may have a generally annular geometry. The radial interior portion 94 may extend circumferentially around the second rotational axis 72 so as to form, for example, a full hoop. The peripheral portion 92 may extend circumferentially around the second rotational axis 72 so as to form, for example, a full hoop. The peripheral portion 92, however, may be configured to also form a window 96 (see also FIGS. 5A-6). This window 96 may be sized and shaped such that a portion (e.g., a minor segment) of the second gear 62 may extend radially through the window 96 and mesh with the first gear 60 as described above. The window 96 may also be sized and shaped to enable the lubricant system to direct the lubricant onto the first and/or the second gear teeth 70, 76.

Figure 5A:
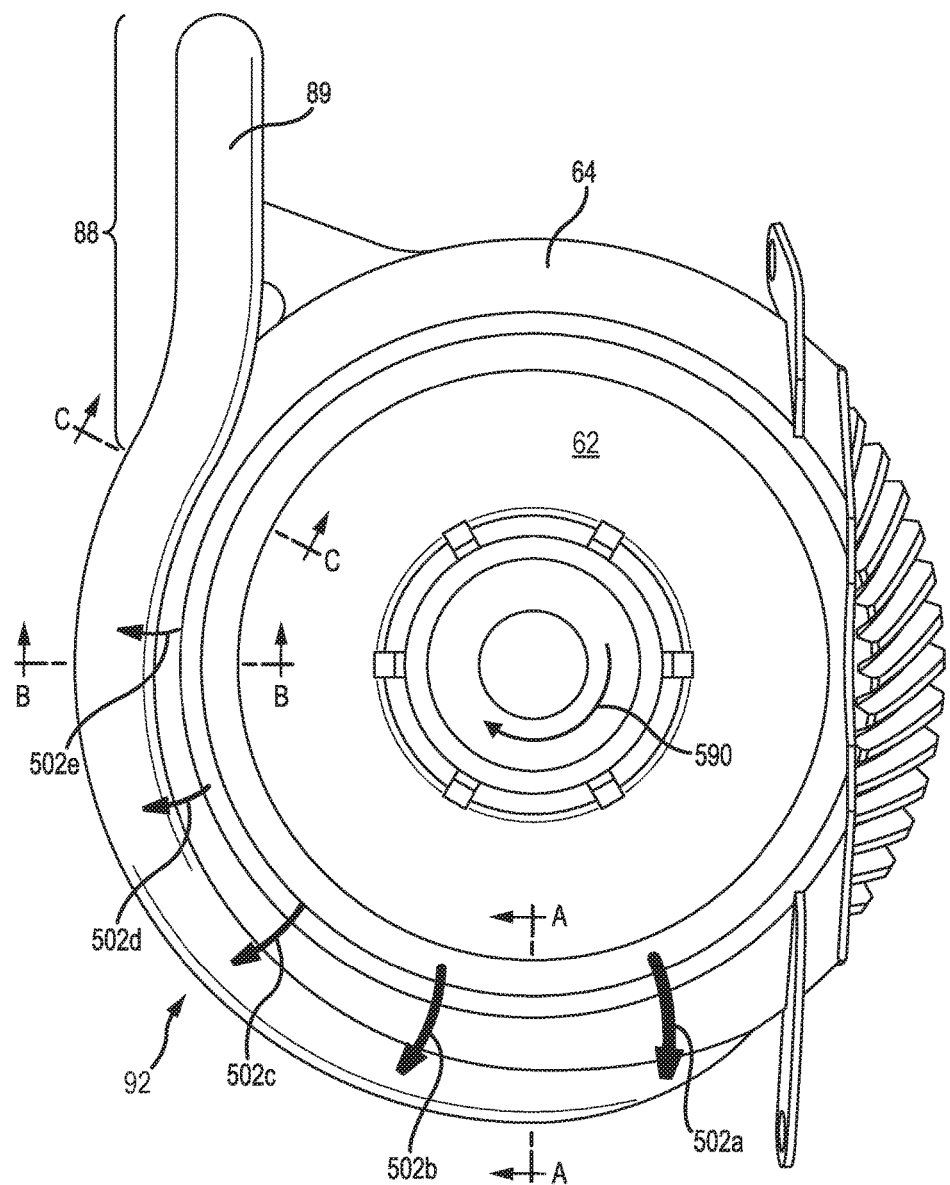
FIG. 5A illustrates an axial view of the baffle, in accordance with various embodiments.

With reference to FIG. 5A, a top view of baffle 64 and second gear 62 is illustrated, in accordance with various embodiments. With additional reference to FIG. 5B, FIG. 5C, and FIG. 5D, cross-section views of baffle 64 of FIG. 5A are illustrated, in accordance with various embodiments. Peripheral portion 92 may be further configured to form a channel 510. Stated another way, peripheral portion 92 may define at least a portion of channel 510. In various embodiments, with additional reference to FIG. 4, channel 510 may extend circumferentially around second rotational axis 72. In various embodiments, channel 510 may extend between 1.5 radians and 4.8 radians circumferentially around second rotational axis 72. In various embodiments, channel 510 may extend between 1.7 radians and 3.5 radians circumferentially around second rotational axis 72. In various embodiments, channel 510 may extend between 2 radians and 3.14 radians circumferentially around second rotational axis 72.

With momentary additional reference to FIG. 3, during operation, the second gear 62 may propel lubricant (used for lubricating the meshing between the gears 60 and 62) off the second gear teeth 76. In various embodiments, this lubricant may be propelled off the second gear teeth 76 at a region approximately where those second gear teeth 76 disengage from the first gear teeth 70 (see arrow 502a). In various embodiments, this lubricant may be propelled off the second gear teeth 76 at a region located in the direction of rotation of second gear 62 from where second gear teeth 76 disengage from the first gear teeth 70 (see arrows 502b-502e). In this regard, it is contemplated that the further from the region approximately where second gear teeth 76 disengage from the first gear teeth 70 in the direction of rotation of second gear 62, the less lubricant will be propelled off the second gear. Stated another way, as illustrated by the relative sizes of arrows 502, more lubricant may be propelled off second gear 62 near arrow 502a than will be propelled off second gear 62 near arrow 502b, etc. This lubricant may be propelled off the second gear teeth and into channel 510. In this regard, the cross-section area of channel 510 may increase along the circumferential direction of baffle 64. Stated another way, the cross-section area of channel 510 as measured along section A-A may be less than the cross-section area of channel 510 as measured along section B-B. The cross-section area of channel 510 may increase along the direction of rotation 590 of second subset 84 of gear teeth 76 (see FIG. 2). This increasing cross-section area of channel 510 may be configured to accommodate the lubricant received by channel 510. This increasing cross-section area of channel 510 may be configured to prevent blockage or backflow of lubricant in channel 510.

Baffle 64 may comprise a baffle outlet 88 towards which lubricant in channel 510 is directed to move lubricant away from the second gear 62. Stated another way, channel 510 may be configured to direct the lubricant in the direction of rotation 590 of second subset 84 of gear teeth 76 (see FIG. 2). In various embodiments, baffle outlet 88 may comprise a duct 89 configured to direct the lubricant away from the second subset 84 of gear teeth 76 (see FIG. 2). In this manner, baffle outlet 88 may direct the majority of the used lubricant away from the second gear teeth 76 (see FIG. 2). This in turn may reduce windage on the second gear teeth 76 and, thereby, further increase transmission system 54 efficiency (see FIG. 2).

Although having previously described channel 510 as having a varying cross-section area, in various embodiments, channel 510 may comprise a uniform cross-section area along the circumference of baffle 64.

Figure 5B:
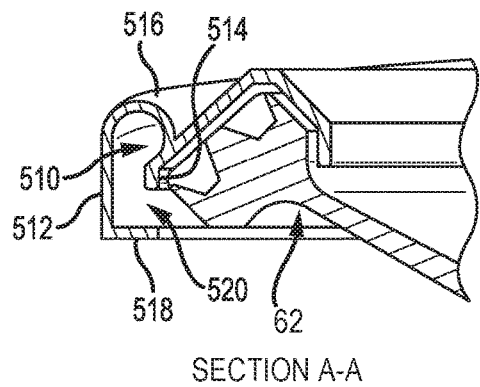
FIGS. 5B-5D illustrate sectional views of a portion of the gear and a portion of the associated baffle of FIG. 5A, in accordance with various embodiments.
Figure 5C:
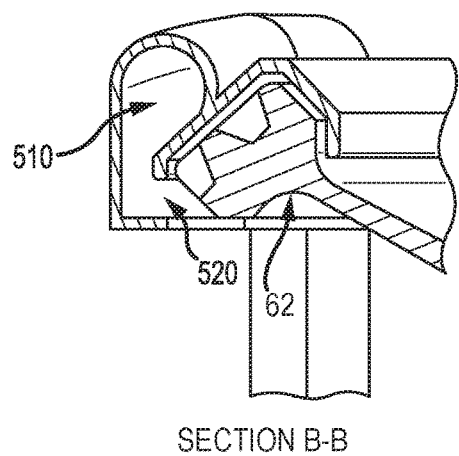
Figure 5D:
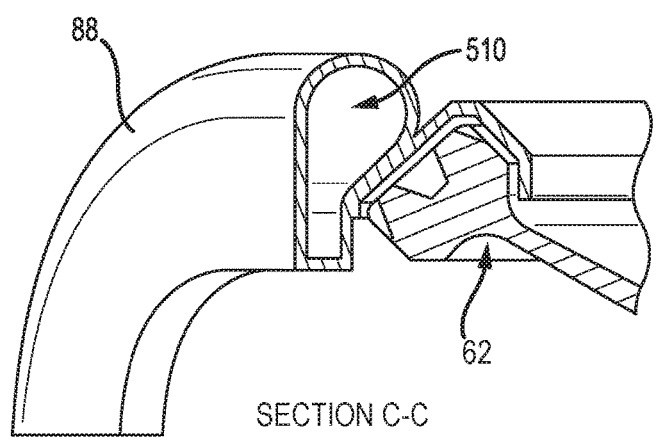

With reference to FIG. 5B, channel 510 may be defined by a first wall (also referred to herein as an outer wall) 512 and a second wall (also referred to herein as an inner wall) 514. In various embodiments, the first wall 512 may be coupled to the second wall 514 via a third wall (also referred to herein as a top wall) 516, and a fourth wall (also referred to herein as a bottom wall) 518. Second wall 514 may be located radially outward from second gear 62. Second wall 514 may comprise a slot 520. Stated another way, slot 520 may be disposed in second wall 514. Slot 520 may be for receiving lubricant from second gear 62 into channel 510.

In various embodiments, with additional reference to FIG. 4, slot 520 may extend circumferentially around second rotational axis 72. In various embodiments, channel 510 may extend between 1.5 radians and 4.8 radians circumferentially around second rotational axis 72. In various embodiments, slot 520 may extend between 1.7 radians and 3.5 radians circumferentially around second rotational axis 72. In various embodiments, slot 520 may extend between 1.7 radians and 3.14 radians circumferentially around second rotational axis 72.

Although first wall 512 is illustrated as comprising a straight geometry (in the axial direction), first wall 512 may comprise rounded geometry, or any other suitable geometry. Although second wall 514 is illustrated as comprising a straight geometry (in the axial direction), second wall 514 may comprise rounded geometry, or any other suitable geometry. Although third wall 516 is illustrated as comprising a rounded geometry (in the radial direction), third wall 516 may comprise a straight geometry, or any other suitable geometry. Although fourth wall 518 is illustrated as comprising a straight geometry (in the radial direction), fourth wall 518 may comprise a rounded geometry, or any other suitable geometry. In this regard, channel 510 may comprise a square, rectangular, triangular, trapezoidal, polygonal, round, ellipsoidal, or any other geometry, including combinations thereof.

In various embodiments, first wall 512 may be located radially outward from second wall 514. Second wall 514 may be located radially outward from second gear 62. Second wall 514 may be located radially outward from radial interior portion 94 (see FIG. 4). In this regard peripheral portion 92 (see FIG. 4) may include first wall 512, in accordance with various embodiments.

Figure 6:
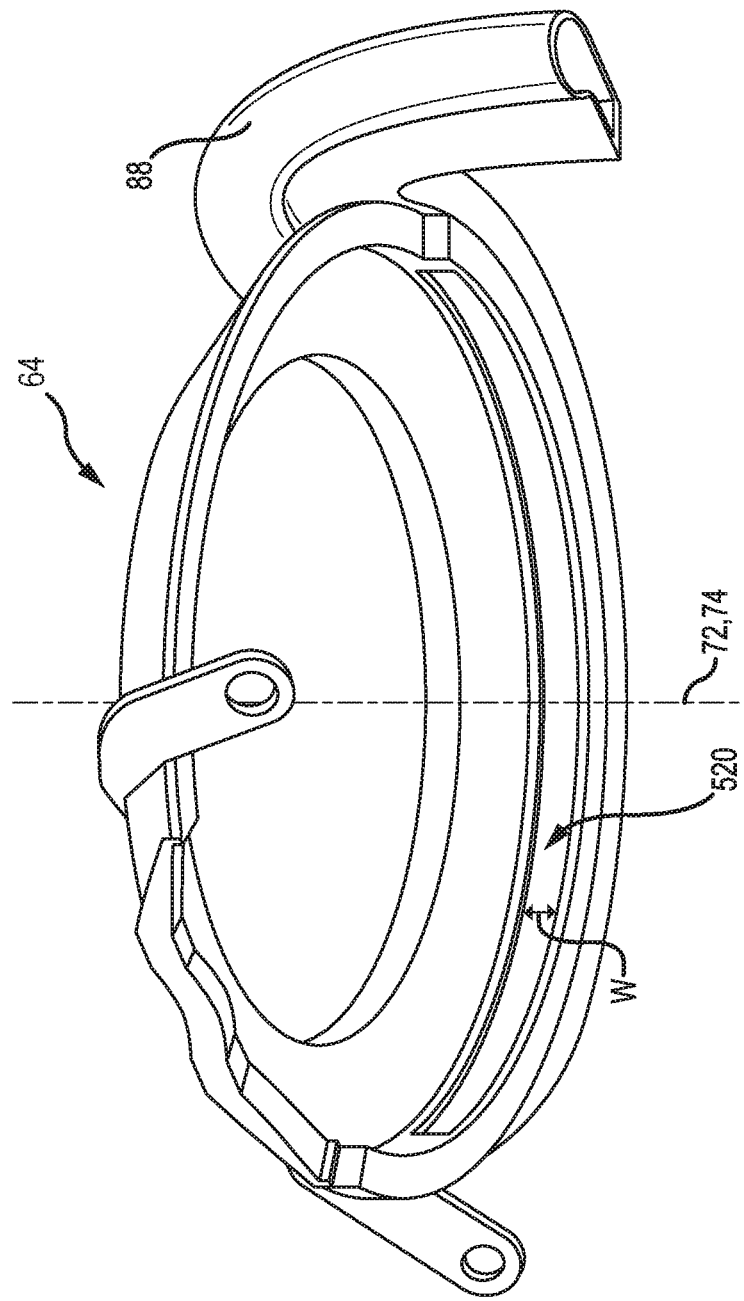
FIG. 6 illustrates a perspective view of the interior side of the baffle, in accordance with various embodiments.

With additional reference to FIG. 6, in various embodiments, the width W of slot 520 may be uniform. In various embodiments, the width W of slot 520 may vary. For example, the width W of slot 520 near arrow 502a may be greater than the width W of slot 520 near arrow 502e. In this regard, width w of slot 520 may vary along the circumferential direction. In various embodiments, varying the width W of slot 520 may allow channel 510 to retain lubricant.

The transmission system 54 (see FIGS. 1 and 2) may be included in various turbine engines other than the one described above as well as in other types of rotational equipment; e.g., any system which utilizes lubricated bevel gears, for example. The transmission system 54, for example, may be included in a geared turbine engine where a gear train connects one or more shafts to one or more rotors in a fan section, a compressor section and/or any other engine section. In various embodiments, the transmission system 54 may be included in a turbine engine configured without a gear train. The transmission system 54 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A baffle for a gear comprising:
   a baffle wall;
   a channel extending circumferentially around an axial centerline, the channel configured to receive a lubricant through a slot; and
   a baffle outlet configured to receive the lubricant from the channel;
   wherein the baffle wall comprises:
      an outer wall defining at least a portion of a radial outer peripheral portion of the baffle wall;
      an inner wall disposed radially inward from the outer wall, wherein the inner wall is oriented substantially parallel with the axial centerline; and
      a radial interior portion disposed radially inward from the inner wall;
   wherein the channel is at least partially defined by the outer wall and the inner wall;
   wherein the slot is at least partially defined by the inner wall, the slot extending circumferentially around the axial centerline,
   wherein the baffle wall is configured to receive the gear radially between the inner wall and the radial interior portion and a plurality of gear teeth of the gear radially aligned with at least a portion of the inner wall.

2. The baffle of claim 1, wherein the baffle wall is configured to prevent a subset of gear teeth from receiving the lubricant.

3. The baffle of claim 2, wherein the channel is configured to direct the lubricant in a direction of rotation of the subset of gear teeth towards the baffle outlet.

4. The baffle of claim 3, wherein the baffle outlet comprises a duct configured to direct the lubricant away from the subset of gear teeth.

5. The baffle of claim 2, wherein a cross-section area of the channel varies along a circumferential direction.

6. The baffle of claim 5, wherein the cross-section area of the channel increases along a direction of rotation of the subset of gear teeth.

7. The baffle of claim 1, wherein the channel extends between 1.5 radians and 4.8 radians circumferentially around the axial centerline.

8. The baffle of claim 1, wherein the slot is disposed in the inner wall at least partially defining the channel.

9. The baffle of claim 1, wherein the baffle further comprises a window, a portion of the gear extending radially through the window.

10. The baffle of claim 1, wherein the slot extends between 1.5 radians and 4.8 radians circumferentially around the axial centerline.

11. The baffle of claim 1, wherein a width of the slot varies along a circumferential direction.

12. A transmission system comprising:
    a first bevel gear;
    a second bevel gear meshed with the first bevel gear, and including a plurality of gear teeth arranged in a circumferential array; and
    a baffle, comprising:
       a baffle wall arranged next to and covering a subset of the gear teeth;
       a channel extending circumferentially around an axial centerline, the channel configured to receive a lubricant through a slot; and
       a baffle outlet configured to receive the lubricant from the channel;
       wherein the baffle wall comprises:
          an outer wall defining at least a portion of a radial outer peripheral portion of the baffle wall;
          an inner wall disposed radially inward from the outer wall, wherein the inner wall is oriented substantially parallel with the axial centerline; and
          a radial interior portion disposed radially inward from the inner wall;
       wherein the channel is at least partially defined by the outer wall and the inner wall;
       the slot is at least partially defined by the inner wall, the slot extending circumferentially around the axial centerline, and
       the baffle wall is configured to receive the second bevel gear radially between the inner wall and the radial interior portion and the plurality of gear teeth radially aligned with at least a portion of the inner wall.

13. The transmission system of claim 12, wherein the subset of the gear teeth are disengaged from the first bevel gear, and another subset of the gear teeth are meshed with the first bevel gear.

14. The transmission system of claim 12, wherein the baffle wall is configured to substantially prevent the subset of the gear teeth from receiving lubricant.

15. The transmission system of claim 12, wherein the slot is disposed in the inner wall defining the channel.

16. The transmission system of claim 12, wherein the baffle further comprises a window, a portion of the second bevel gear extending radially out through the window, and the portion of the second bevel gear meshes with the first bevel gear.

17. The transmission system of claim 12, wherein the baffle outlet comprises a duct configured to direct the lubricant away from the subset of gear teeth.

18. The transmission system of claim 12, wherein the channel extends between 1.5 radians and 4.8 radians circumferentially around the rotational axis.

19. The transmission system of claim 12, wherein the slot extends between 1.5 radians and 4.8 radians circumferentially around the rotational axis.

20. A turbine engine, comprising:
   a turbine engine spool;
   a tower shaft;
   a bearing compartment; and
   a transmission system located within the bearing compartment, the transmission system comprising a first bevel gear, a second bevel gear, and a baffle;
   the first bevel gear connected to the turbine engine spool;
   the second bevel gear connected to the tower shaft and configured to rotate about a rotational axis;
   wherein the second bevel gear includes a plurality of gear teeth arranged in a circumferential array, wherein a first subset of the gear teeth within a first region are meshed with the first bevel gear, and a second subset of the gear teeth within a second region are disengaged from the first bevel gear; and
   the baffle, comprising:
      a baffle wall covering the second subset of the gear teeth;
      a channel extending circumferentially around an axial centerline, the channel configured to receive a lubricant through a slot; and
      a baffle outlet configured to receive the lubricant from the channel;
   wherein the baffle wall comprises:
      an outer wall defining at least a portion of a radial outer peripheral portion of the baffle wall;
      an inner wall disposed radially inward from the outer wall, wherein the inner wall is oriented substantially parallel with the axial centerline; and
      a radial interior portion disposed radially inward from the inner wall;
   wherein the channel is at least partially defined by the outer wall and the inner wall;
   the slot is at least partially defined by the inner wall, the slot extending circumferentially around the axial centerline, and
   the baffle wall is configured to receive the gear radially between the inner wall and the radial interior portion and the plurality of gear teeth radially aligned with at least a portion of the inner wall.

* * * * *